Patented Sept. 12, 1939

2,172,690

UNITED STATES PATENT OFFICE 2,172,690

INSECTICIDE

Walter C. O'Kane, Durham, N. H., assignor to Spray Base Corporation, Jersey City, N. J., a corporation of New Jersey No Drawing. Application January 5, 1937, Serial No. 119,093

13 Claims. (Cl. 167—43)

This invention is directed to a novel composition useful for the economic control of insect pests.

In its broadest aspect the invention seeks to provide a combination of several ingredients which cooperate to produce an insecticide that is particularly efficacious in controlling the insects which are harbored by trees, plants and other types of foliage and which cause considerable damage to them in their life cycle. There have been many attempts made to provide insecticides which had the essential qualifications of killing the insect at any or all stages of its development and yet which would not unfavorably affect the plant on which it lived while at the same time was in a form in which it could be readily and efficiently applied to the insect. There are available many insecticides that can be successfully used under carefully regulated conditions but which under some conditions are either ineffective or on the other hand, actually dangerous to use on plant life. Some of these insecticides although strong enough to control the insect life are so strong or have undesirable properties in that they "burn" the foliage in which case the treatment is in many instances harder on the plant than the damage that might have been caused by the insect. Certain insecticides when applied to a plant apparently have no ill effect yet over a period of years the strength of the plant is reduced and its crop of fruit or the like may gradually taper off until there is no marketable crop therefrom. This effect has been noted in the case of certain types of oils that have been applied to plants, trees and other types of foliage.

Some insecticides are effective to kill insects only in certain stages of their development so that if the spray or application of the insecticide is not properly timed to cover that portion of the life cycle of the insect the treatment made has no effect and insects continue to develop as they had previously done and would have done had the control measures not been taken.

The present invention seeks to overcome these difficulties of the prior art in providing an insecticide that can be very conveniently applied to the insect as a spray. Such a spray comprises the insecticide of the type hereinafter described emulsified or dispersed in an aqueous medium. This requires that the concentrate shall be of a type which can be readily dispersed in the aqueous medium without undue mechanical agitation, critical manipulation and the like.

It is likewise an object of this invention to provide an insecticide that is effective for all types of insects commonly found infesting trees, plants and other types of foliage. Such an insecticide must be effective on all stages of insect development that can be reached by the usual forms of application.

A further object is to provide an insecticide which can be safely applied to the foliage without causing any direct damage or have other cumulative ill effects.

To obtain these and other related objects which will be hereinafter described or apparent, I provide a concentrate for an insecticidal spray that comprises four principal components: a mineral oil, a contact insecticide, a volatile liquid in which the contact insecticide is soluble and which it itself soluble in the oil, and an emulsifying agent soluble in the concentrate.

It has previously been suggested to spray foliage with various oils as for example, mineral oil. Insecticides or specifically contact insecticides have been frequently applied to foliage in a number of ways. It is common to dust contact insecticides on foliage and some have been applied by spraying but prior to my invention thereof it was not suggested to provide an insecticide concentrate comprising a contact insecticide in a fixed oil together with an oil soluble emulsifying agent. This combination forms the claimed subject matter of my copending application Serial No. 728,407 filed May 31, 1934, issued as U. S. Patent No. 2,104,757, dated January 11, 1938.

The instant invention is particularly distinguished from the claimed prior invention in that a mineral oil is substituted at least in part for the fixed oil and as in the case of my copending application Serial No. 112,463 filed November 24, 1936, (for a four component fixed oil concentrate) by a fourth ingredient combined with this three component concentrate. This fourth ingredient is a relatively volatile liquid that forms a solvent for the contact insecticide and is itself soluble in the oil employed. When such a volatile liquid is included in the combination, the insecticide considered as a whole, is much more effective than is the case where the volatile ingredient is not present. The reason why this is true is not clearly apparent but it appears that the solvent ingredient, usually comprising a liquid of rather small molecules, is able to pass or migrate through the oil very rapidly and carry with it the contact insecticide that is soluble therein. In this way the contact insecticide is brought to the outer surfaces of the very thin film of oil and if one of these surfaces is in contact with an insect the more active ingredient carries the insecticide over the surface of the insect and brings the toxicant to the vulnerable areas of the insect where it acts on the insect and ultimately kills it. The mineral oil itself is able to carry the toxicant to the insect to a certain extent but it is not nearly as effective as when a smaller molecule volatile solvent liquid is dissolved therein. It is also possible that the volatile liquid can more effectively "wet" the waxy surface of the insect and cover it more completely or alternatively penetrate through various portions thereof to the vital organs of the insect. At any rate, whatever the explanation may be, and the above is submitted simply as a possible theoretical explanation and not as a limitation of the invention, it is a fact that the insecticide prepared in the manner herein described is substantially more effective through the incorporation of the volatile ingredient. A large number of comparative tests have been run using a three-component concentrate (i. e. toxicant, mineral oil and an emulsifying agent) and the four component concentrate herein described and the four component base was substantially more effective in its insect killing power. Also the amount of dilution did not vary the effectiveness of the insecticide as greatly as was true when the volatile ingredient was omitted.

The principal ingredient of the insecticide base comprises a mineral oil and may be of the type generally described as a "white" or medicinal oil which has a high sulfonation value indicating a low percentage of unsaturates. Mineral oils distilled and refined by ordinary commercial processes are of themselves toxic to insects but are likewise dangerous when used on foliage producing burning and other ill effects. These properties are apparently related to the amount of unsaturates present in the oil since when the oils are refined they may be used with a greater degree of safety but at the same time the toxicity is decreased. That is, oils with low sulfonation values are fairly toxic but cause plant injuries while refined oils of high sulfonation values, above 90 and preferably above 95, do not cause direct injury to the foliage and do not serve effectively as toxicants. It has been suggested that organic toxicants be incorporated in the refined oils and while this resulted in some improvement over the oil alone such compositions are much less effective than the four component insecticide concentrate herein described.

I have found that in the four component concentrate it is possible to safely use less highly refined oils, i. e. with a 70% sulfonation value and higher viscosities (130 second Saybolt) than the 60 to 90 second Saybolt oils customarily used in oil sprays. Another important advance resides in the discovery of the fact that by replacing a part of the mineral oil by a fixed oil or glyceride the safety factor on plants is greatly increased. This is true whether the glyceride serves with a low sulfonation value oil or a highly refined white oil. The addition of at least 10% (based on the mineral oil) of a glyceride reduces and prevents original damage by ordinary mineral oils and likewise avoids cumulative ill effects from decomposition of white oils. Such action is independent of the presence of the volatile ingredients which produces a similar effect in a different manner.

This mineral oil either alone or mixed with another bland oil, such as the glycerides set forth in my copending application Serial No. 112,463 filed November 24, 1936, forms the principal ingredient both as to amounts and as to persistence on the insect or foliage. It is substantially non-volatile under conditions of use. When once applied it remains where it is first deposited when the emulsion breaks and there it stays in contact with the foliage or insect indefinitely. Any such material must, of course, not have any toxic effect towards the leaf. It must not, of course, smother the pores or in any manner burn the foliage. This is always important and particularly so when the new leaves are budding or when the plant is in blossom. Many oils, if applied at this time, or in large amounts, will practically kill a tree. I have found that the refined high sulfonation value mineral oils can be used with comparative safety at practically any time in the growing or dormant season when incorporated in the present composition. Because this concentrate can be highly diluted and retain its effectiveness, the commercial oils of about a 75% sulfonation value can also be used. Insects are usually more active during the growing season and therefore it is usually desirable to spray the tree or plant at that time but many types of oil sprays cannot be applied except during the dormant season.

A wide selection is permitted in the choice of the toxicant although it must have certain properties as hereinafter described. The toxicant must be of the type generally termed a contact insecticide, that is, on which acts on insects irrespective of the character of the insect's mouth parts. The way in which such insecticides act on an insect is not definitely known although the effects of such toxicants are readily apparent. Presumably it is due to action on vital organs on the surface of the insect or through penetration to vital organs within the insect or both. It is generally recommended by entomologists that if an insect can be controlled by a stomach poison such method is preferable but by means of this invention it is possible to control both sucking and biting insects with a single type of spray.

The toxicant selected should not only be a contact insecticide but must also be one that is soluble at least in the volatile component hereinafter more specifically described and preferably one which is likewise soluble in the oil. In some cases the volatile component may be used to extract a toxicant from its source. A contact insecticide which meets these requirements is pyrethrum flowers which can be extracted to give pyrethrins and possibly other toxicants. Instead of pyrethrum flowers or their extracts it is possible to use other extracts either singly or in combination although they should be soluble at least in the volatile component and should not precipitate from the concentrate. These include for example, nicotine alkaloid, the active principal of strychnia, as well as various synthetic organic compounds including amines, thiocyanates, for example, aromatic thiocyanates, aliphatic thiocyanates, and other known insecticides. It is interesting to note at this point that many of the new synthetic insecticides are likely to cause substantial plant damage unless used under very carefully controlled conditions. When these insecticides are used in the instant composition to form an insecticidal concentrate these undesirable properties are greatly minimized while the effectiveness of the toxicant is not reduced and may be increased.

In the case of extracts, particularly, it is usually necessary that contact with water be avoided and the concentrate be anhydrous. In general, water forms no part of the concentrate herein described and is added only when the spray dispersion is prepared just prior to spraying. The absence of water reduces the amount of inerts present, obviates dangers of freezing and broken emulsions from elevated temperatures, reduces transportation costs, yet the concentrate readily forms the proper type of dispersion for a spray.

The amount of toxicant used in the spray base can be varied within rather wide limits depending upon the character of the particular toxicant. In the case of pyrethrins it has been found very satisfactory to employ the equivalent of three pounds of one percent pyrethrum flowers per gallon or what might be considered as .03 pound of pyrethrins per gallon of concentrate. Other insecticides can be used in proportionate amounts depending upon the relative efficacy as compared to pyrethrum flowers.

The third and distinguishing ingredient of the present composition comprises a volatile liquid in which the contact insecticide is soluble and which is itself soluble in the oil. The volatile component is preferably employed in a quantity equal to about 25% of the total concentrate or roughly about ⅓ of the amount of the oil. These proportions may be varied within rather wide limits but the mineral oil should usually comprise from 45 to 85% of the concentrate while the volatile solvent ingredient should be present in from about 10 to 50% when an effective emulsifying agent need be present in an amount of not over about 5%. Where a less effective emulsifying agent is used the above relative proportions are employed but the mineral oil and solvent will form a smaller percentage of the entire concentrate.

This volatile solvent acts in a number of ways. In the first place it dilutes the oil and reduces its viscosity resulting in greater and more rapid spread and penetrating power to produce an extremely thin film. Even highly refined mineral oils when exposed to sunlight as on a leaf surface undergo some changes resulting in the production of reaction products injurious to the leaves. If a thick film such as that produced by ordinary oil sprays is present, the damage may be serious. In the composition forming the subject matter of this disclosure an extremely thin, effective, uniform film can be obtained, thereby minimizing the dangers inherent in the decomposition of a thick oily layer. Furthermore the volatile solvent assists in aiding the emulsification of the oil in the water by the emulsifying agent hereinafter more particularly described to form the spray solution which is a dispersion of the concentrate in water in dilutions which may vary according to the particular type of spray from proportions ranging from one part of the base to fifty parts of water to from one part of base to as high as a thousand parts of water with various intermediate ranges as may be desired but preferably from one to two hundred to one to eight hundred.

When the spray is applied to the insect, and incidentally the foliage, the volatile component assists in the rapid spread of the minute particles deposited when the emulsion breaks. This rapid spread causes a uniform coating and permits penetration into the various recesses in the coating of insects. It likewise permits a ready "wetting" of the waxy surface of the insect. Since the toxicant is usually more soluble in the volatile component, it will be selectively partitioned therein and the smaller more active molecules rapidly carry the toxicant to both surfaces of the film of oil. On the surface in contact with the insect the volatile liquid carries the toxicant to all portions of the insect where it can act efficiently and effectively. Some insects have waxy woolly threads covering their bodies that are repellent to many sprays. Here the addition of the more fluid, volatile component permits penetration through this protective coating to vital organs of the insect.

The selection of the volatile component is one requiring considerable care since this must satisfy a number of conditions as herein set forth. Nevertheless, there are a large number of compounds which may be employed. It may be a single compound or a mixture but is referred to in the singular. Many liquids have been successfully used which if applied directly to the foliage or as the principal constituent of a dispersion would cause severe burn or would evaporate too rapidly but in the combination as set forth it is possible to employ these liquids, which may in themselves be insecticides to a certain extent, without damaging the foliage.

A suitable volatile liquid that may be incorporated with the oil is a narrow "cut" fraction low boiling petroleum hydrocarbon produced by repeated fractional distillation. Other low boiling petroleum fractions having somewhat wider boiling ranges may likewise be employed. It is important to note that mixtures of such low boiling hydrocarbons with the less volatile mineral oils are quite different both as to composition and usefulness as insecticides from a petroleum oil that can be distilled over a wide temperature range from that of low boiling hydrocarbons to, for example, that of "medium" oils.

In addition to volatile petroleum hydrocarbons I have found that a number of other liquids may be employed. These liquids fall into a number of chemical classes which include, liquid aliphatic compounds, aromatic compounds, terpenes, chlorinated aliphatic and aromatic compounds, esters, organic oxides or ketones, higher alcohols, etc. Among the specific organic compounds that have been successfully employed are the more volatile components of petroleum hydrocarbons, benzene, turpentine, carbon tetrachloride, chloroethylene, monochloroethylene, trichloroethylene, chlorobenzene, trichlorobenzene, amylacetate, dibutyl phthalate, ethyl benzoate, mesityl oxide, pine oil, carbon disulphide and others. These and related compounds that act in a similar manner are included in the term volatile liquid, volatile ingredient or other equivalent expression.

The addition of these volatile ingredients to the combination of an oil, a toxicant, and an emulsifying agent has increased the toxicity of the insecticides and what is more important has produced more uniform kill with varying dilutions. In most instances a one to eight hundred dilution gives very nearly as good results as a one to six hundred dilution while with the three component mixture the higher dilution was less effective The insecticide concentrate includes, as its fourth component, an oil soluble emulsifying agent which is preferably substantially anhydrous. Where a very effective emulsifying agent such as Emulphur E. L., sold by the General Dyestuff Company, is incorporated only about three to five percent is necessary. Emulphur is manufactured under United States Patent No. 75

1,970,578 to Schoeller et al. It is extremely important to include an oil soluble emulsifying agent in the concentrate. In the first place it assists in uniformly dispersing certain types of extract contact insecticides in the concentrate which might otherwise agglomerate or coagulate and eventually precipitate so that thereafter a uniform application to the insect infested areas would be impossible. The presence of the emulsifying agent in the concentrate also makes possible the preparation of a proper type of aqueous spray.

Some medium is necessary to distribute insecticides in small but effective amounts uniformly over the infested areas of plants, trees or other foliage. The cheapest and most convenient distributing agent, with no ill effects on the host, is water. However many toxicants and all oils are water insoluble making solution in water impossible. Distribution in water can be obtained by dispersion or emulsification through the addition of a suitable agent in proper amounts. Since the water serves no useful purpose in an insecticide except to distribute it, means should be provided to remove the water from the applied insecticide. This can be accomplished by controlling the character of the spray dispersion produced which depends on the nature and amount of emulsifying agent employed as well as on the method of preparing the dispersion.

In using my insecticide concentrate it is preferable to have a relatively unstable dispersion, that is, one which will break after application to the insects and foliage. The water will not "wet" the insect and if it drips off before the emulsion or dispersion breaks it may carry away the active ingredients. By using Emulphur E. L. in the proportions indicated as a component of the concentrate there is provided a concentrate that readily disperses in water yet breaks to deposit the toxicant at the proper time. When a water soluble emulsifying agent is mixed with water and the other ingredients added to this water emulsion a properly performing dispersion cannot be obtained and results, in terms of effectiveness and persistence, are far inferior. This may be due to the water's forming an intermediate protective film between the insect and the toxicant carrying oil and also excessive dripping or washing away of the active constituents.

While Emulphur E. L., and Emulphur O have been found successful with mineral oils other oil soluble emulsifying agents have been employed but generally in greater relative amounts as for example; sulfonated olive oil 10 to 15%, sodium naphthenate 10 to 15%, diglycol laurate 20 to 40%, "Turkelene" 50%, sulfonated fish liver oil 10 to 20%, "Albasol" 10 to 20% or sulfonated castor oil 10 to 20%.

Tests have been conducted to determine the effectiveness of various toxicants in different spray compositions. One series employed the extract of pyrethrum flowers at a toxicant concentration equivalent to the extract of three pounds of 1% pyrethrum flowers per gallon of concentrate or 1.54 grams of pyrethrum extract, analysing about 25% pyrethrins, per 100 cc. The following table shows comparative tests with a constant toxicant concentration of pyrethrum extract between (1) the volatile ingredient, an emulsifier, and toxicant (2) a white oil, an emulsifier, and toxicant and (3) 72% white oil, 25% volatile ingredient, 3% emulsifier, and toxicant. In each case the toxicant was present in the constant proportion indicated. The values are comparative only in pairs in a horizontal series for since the tests other than a particular series for two concentrations were not carried out under identical conditions as to time of day, temperature and humidity. The hosts and insects were uniform.

*Percent kill brought about by a constant toxicant when incorporated in the following media*

| Particular volatile ingredient | Dilution | (1) Volatile ingredient | (2) Oil | (3) Volatile ingredient and oil | No spray check |
|---|---|---|---|---|---|
| Turpentine | 1-800 | 47.5 | 81.2 | 90.5 | ----- |
|  | 1-600 | 64 | 85.3 | 91.2 | 1.5 |
| Trichloroethylene | 1-800 | 35.2 | 85.7 | 93.6 | ----- |
|  | 1-600 | 46.8 | 94.4 | 94.8 | .55 |
| Amylacetate | 1-800 | 11.5 | 83.3 | 91.9 | ----- |
|  | 1-600 | 21.9 | 83.5 | 88.4 | 1.9 |
| Mesityl oxide | 1-800 | 19.7 | 95.2 | 98.8 | ----- |
|  | 1-600 | 31.3 | 95.0 | 99.1 | .65 |
| Chlorobenzene | 1-800 | 43.2 | 74.6 | 77.0 | ----- |
|  | 1-600 | 69.5 | 77.3 | 85.9 | 7.5 |
| Trichlorobenzene | 1-800 | 51.4 | 64.9 | 74.0 | ----- |
|  | 1-600 | 53.3 | 78.0 | 79.5 | 2.5 |
| Ethyl benzoate | 1-800 | 21.2 | 56.5 | 86.5 | ----- |
|  | 1-600 | 67.3 | 86.0 | 89.8 | .2 |
| Carbon tetrachloride | 1-800 | 32 | 33 | 79 | ----- |
|  | 1-600 | 43.5 | 77 | 66 | 2.5 |
| Carbon bisulphide | 1-800 | 21.5 | 63.5 | 93.5 | ----- |
|  | 1-600 | 29 | 66.0 | 91.5 | 2. |

It will thus be seen that this invention provides a new and useful insecticide of greater effectiveness in killing insects, without plant damage, and also enhances the yield of marketable product.

Another advantage of the insecticide described herein is its compatibility for other types of insecticides. The greater part of the cost of spraying comes from the time and wages of the workers, the materials used being rather inexpensive in comparison. It has accordingly been recommended by entomologists that wherever it is possible to make two or three applications at once by using combined sprays such practice should be followed. In practice great difficulty has been experienced in following such recommendations since great precautions must be taken in mixing conventional sprays because in some instances the materials of two or more sprays, when combined, will undergo changes, producing substances injurious to the plant or affecting the value of the spray for the purpose for which it was intended.

The instant insecticide is for the most part not subject to this disability since many stomach poisons or fungicides except sulfur and sulfur containing compounds can be added for unitary application with the contact insecticide. In many cases such additions are not necessary but when desirable can be readily accommodated in a single spray. The oil, solvent and emulsifying agent then perform the additional function of spreaders and stickers. For example, fungicides such as copper zeolite can be incorporated in the concentrate. Other materials having fungicidal properties may likewise form a part of the spray as applied to the trees and plants. Stomach poisons, i. e. arsenic compounds, fluorine compounds and the like may be used in a similar manner. It should be noted, however, that while such additions can be made for specific conditions they are usually unnecessary since for most purposes the concentrate is complete in itself.

Having thus described my invention with examples of certain preferred embodiments thereof what I claim is:

1. An insecticidal concentrate comprising a plant spray mineral oil, a contact insecticide, a volatile liquid in which the contact insecticide is soluble and which is itself soluble in the oil and an emulsifying agent soluble in the concentrate.

2. An insecticidal concentrate comprising a white oil, a contact insecticide, a volatile liquid in which the contact insecticide is soluble and which is itself soluble in the oil and an emulsifying agent soluble in the concentrate.

3. An insecticidal concentrate comprising a plant spray mineral oil, the toxic values of pyrethrum, a volatile liquid in which the contact insecticide is soluble and which is itself soluble in the oil and an emulsifying agent soluble in the concentrate.

4. An insecticidal concentrate comprising a plant spray mineral oil, the toxic values of pyrethrum, a volatile petroleum hydrocarbon and an emulsifying agent soluble in the concentrate.

5. An insecticidal concentrate comprising a plant spray mineral oil, the toxic values of pyrethrum, a volatile petroleum hydrocarbon and "Emulphur E. L."

6. An insecticidal concentrate comprising a plant spray mineral oil, nicotine alkaloid, a volatile liquid in which the contact insecticide is soluble and which is itself soluble in the oil and an emulsifying agent soluble in the concentrate.

7. An insecticidal concentrate comprising a plant spray mineral oil, a contact insecticide, a volatile petroleum hydrocarbon and an emulsifying agent soluble in the concentrate.

8. An insecticidal concentrate comprising a plant spray mineral oil, a contact insecticide, turpentine and an emulsifying agent soluble in the concentrate.

9. An insecticidal concentrate comprising a plant spray mineral oil, a contact insecticide, a volatile chlorinated hydrocarbon and an emulsifying agent soluble in the concentrate.

10. An insecticidal spray comprising one part of an insecticidal concentrate comprising a plant spray mineral oil, a contact insecticide, a volatile liquid in which the contact insecticide is soluble and which is itself soluble in the oil and an emulsifying agent soluble in the concentrate dispersed in from about 50 to 1000 parts of water.

11. An insecticidal spray comprising one part of an insecticidal concentrate comprising a white oil, a contact insecticide, a volatile liquid in which the contact insecticide is soluble and which is itself soluble in the oil and an emulsifying agent soluble in the concentrate dispersed in from about 50 to about 1000 parts of water.

12. An insecticidal spray comprising one part of an insecticidal concentrate comprising a plant spray mineral oil, a contact insecticide, a volatile petroleum hydrocarbon and an emulsifying agent soluble in the concentrate dispersed in from about 50 to about 1000 parts of water.

13. An insecticidal concentrate comprising from about 45% to 85% of a plant spray mineral oil, a contact insecticide, from about 10% to 50% of a volatile liquid in which the contact insecticide is soluble and which is itself soluble in the oil and an emulsifying agent soluble in the concentrate.

WALTER C. O'KANE.